July 13, 1943.    L. A. PARADISE    2,324,171
HARVESTER PLATFORM
Original Filed April 29, 1940

INVENTOR
LOUIS A. PARADISE
BY
ATTORNEY

Patented July 13, 1943

2,324,171

UNITED STATES PATENT OFFICE 2,324,171

HARVESTER PLATFORM

Louis A. Paradise, Moline, Ill., assignor to Deere & Company, Moline, Ill., a corporation of Illinois Original application April 29, 1940, Serial No. 332,290. Divided and this application September 24, 1941, Serial No. 412,133

1 Claim. (Cl. 198—184)

The present invention relates generally to harvester platforms of the type comprising a flexible endless draper or apron which runs between a pair of laterally spaced side walls and is trained over a pair of parallel rollers disposed at opposite ends of the platform. The principal object of this invention relates to the provision of novel and improved fastening means for joining the ends of the draper, which can be quickly and easily installed and removed. Heretofore, it has been the practice to join the ends of a draper to form an endless conveyor, by means of a plurality of bolts spaced rather closely together across the entire width of the draper. The present invention contemplates the use of a transversely slidable bar member which engages with a pair of beads secured along the two edges of the draper. By this means, the edges are quickly and easily joined together and the fastening means is more durable in operation and has fewer parts than in any fastening devices previously in use.

This application is a division of an application filed April 29, 1940, Serial No. 332,290, by Anderson, Frederiksen, Johnson and Paradise and issued January 26, 1943, as Patent No. 2,309,155.

Figure 1:
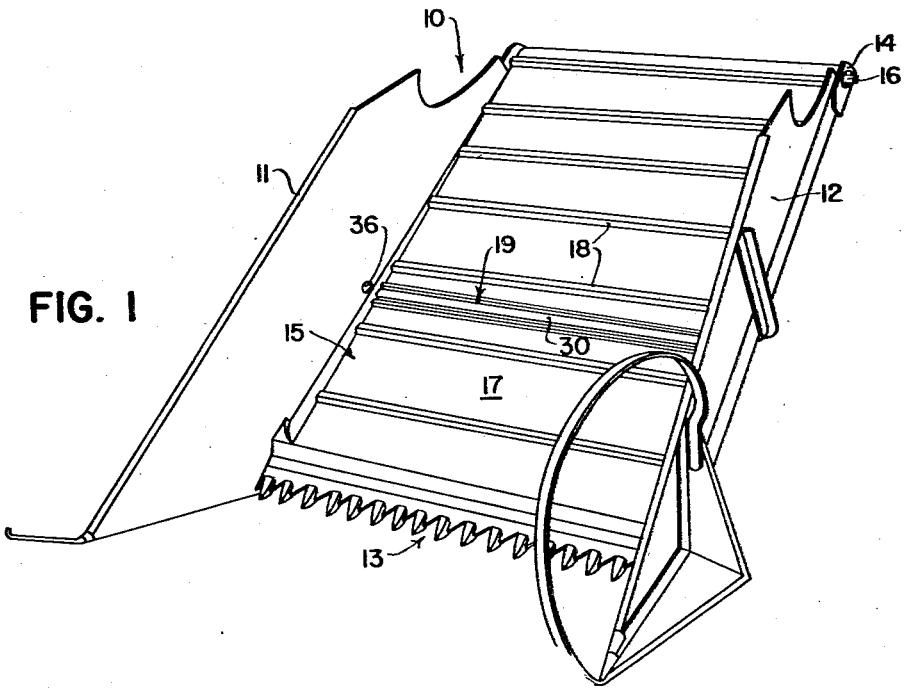
Figure 2:
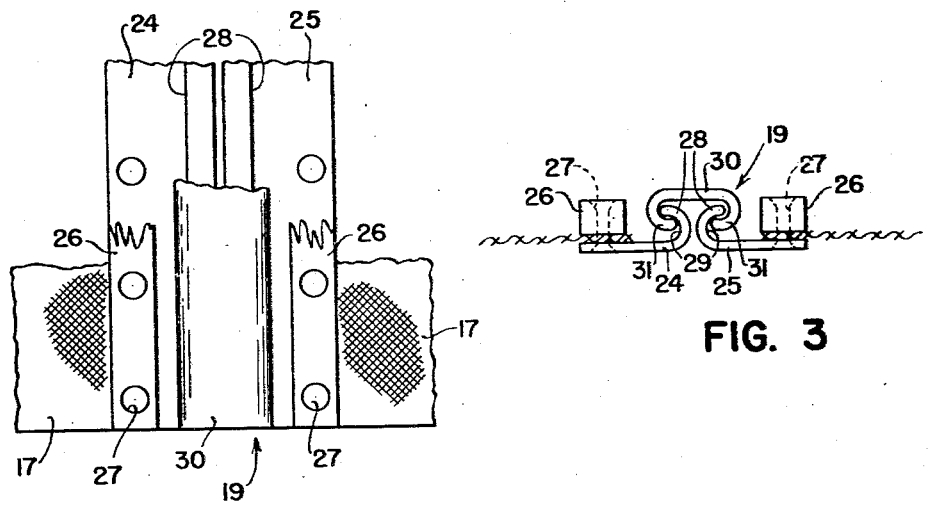
Figure 3:
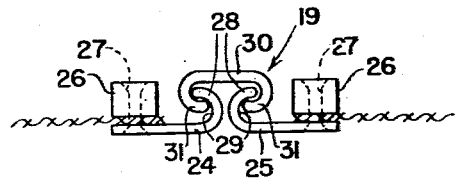

The above-mentioned objects and advantages of this invention will be apparent after a consideration of the following description in which reference is made to the drawing appended hereto, in which Figure 1 is a perspective view of a harvester platform showing a draper having a fastener embodying the principles of this invention;

Figure 2 is a fragmentary plan view of one end of a draper fastener embodying the principle of this invention; and Figure 3 is an end view of the fastener illustrated in Figure 2.

Referring now to the drawing, reference numeral 10 indicates in its entirety a harvester platform having a pair of laterally spaced side walls 11, 12 and a cutter bar 13 disposed transversely across the front end of the platform. The platform has a pivot bearing 14 for supporting the platform on a harvester body, providing for vertical swinging movement of the platform on a transversely extending axis. A draper 15 is movable on the platform between the side walls 11, 12 and is trained over suitable rollers (not shown), one of which is disposed behind the cutter bar 13 and the other of which is journaled for rotation about the axis of vertical pivoting movement of the platform in a manner well-known to those skilled in the art, and has a shaft extension 16 through which power is transmitted for driving the conveyor 15 in such a direction that the upper flight moves upwardly and rearwardly.

The draper 15 comprises a fabric 17, to which is secured at intervals a plurality of transversely disposed slats 18, preferably made of wood and riveted to the fabric. The ends of the fabric are joined by means of a novel fastener, indicated in its entirety by reference numeral 19.

The fastener 19 comprises a pair of metal strips 24, 25, which are secured along the two edges of the fabric 17 which are to be joined, by means of clamping members in the form of bars 26, extending along the edges of the fabric above the upper surface thereof. Each edge of the fabric 17 is clamped between a bar 26 and strip 24 by means of suitable bolts or rivets 27. The inner edges 28 of the strips 24, 25 are curved upwardly and outwardly to provide a pair of abutting surfaces and a pair of juxtaposed beads defining grooves 29 on the sides of the beads opposite the abutting surfaces.

The strips 24, 25 are detachably connected together by means of a channel-shaped joining member 30 having a pair of downwardly and inwardly turned side portions 31 which are adapted to interlock within the grooves 29 under the upwardly turned flange portions 28 of the strips 24, 25. The joining member 30 is slidable into engagement with the grooves 29 from one end of the strips 24, 25.

The draper 15 is installed on a platform with the joining member 30 removed, the fabric being trained over the upper and lower rollers and brought together substantially in the center of the platform. The joining member 30 is then inserted through an aperture 36 in the side wall 11 of the platform substantially on a level with the upper flight of the draper and the flanges 31 are then engaged with the grooves 29, after which the joining member 30 can be slid through the aperture 36 into its normal connected position with its ends substantially flush with the edges of the draper.

Attention is called to the fact that the joint is well protected against stones and other heavy objects by the clamping bars 26 disposed closely adjacent the joining member 30. This reduces the possibility of damage to the joint by objects falling upon the joining member and bending it out of shape. The bars 26 can be made of either wood or metal and are generally flush with the upper side of the joining member 30.

It will be evident to those skilled in the art that this type of fastener greatly simplifies the operation of removing and replacing the harvester draper. This encourages the operator of the harvester to remove the draper when the machine is not in use and store the same in a suitable place protected from the weather, thereby resulting in a longer life and more satisfactory operation of the draper.

I claim:

In a harvester having a pair of side walls, a draper movable between said walls, said draper comprising a flexible fabric having a pair of transverse edges normally joined during operation, and means for joining said edges together including means serving as beads along said edges and a transversely slidable bar member engageable with said beads to secure them together, one of said side walls having an aperture therein substantially in alignment with one flight of said draper, through which aperture said bar member is inserted during installation and removal of said draper.

LOUIS A. PARADISE.